W. H. COLDWELL.
WHEEL MOUNTING.
APPLICATION FILED SEPT. 21, 1916.
1,279,268.
Patented Sept. 17, 1918.
2 SHEETS—SHEET 2.
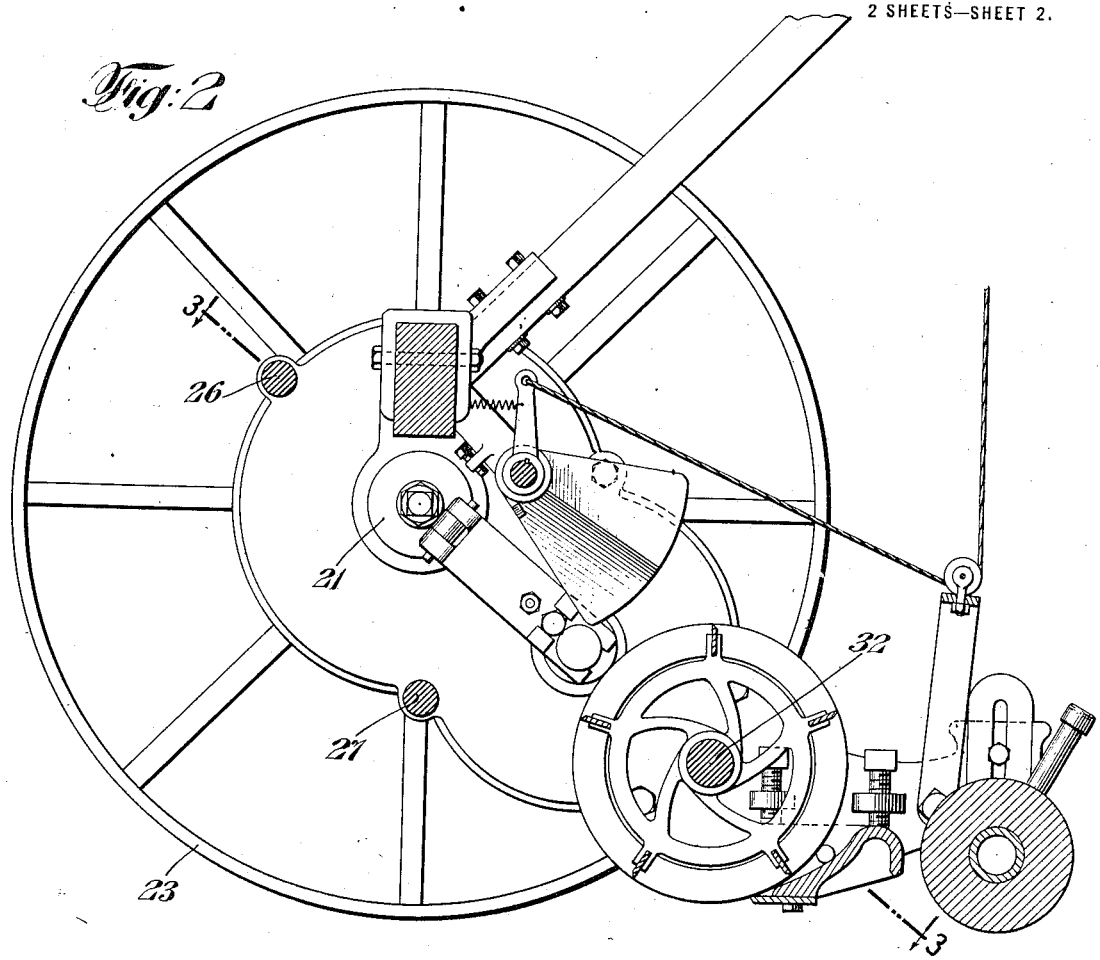
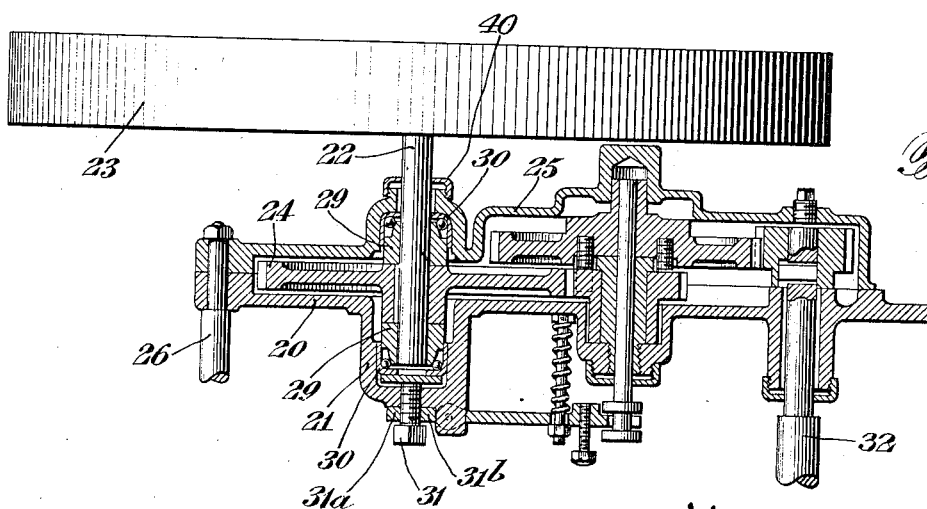
INVENTOR
William H. Coldwell
BY
Whitaker Prevost ATTORNEYS

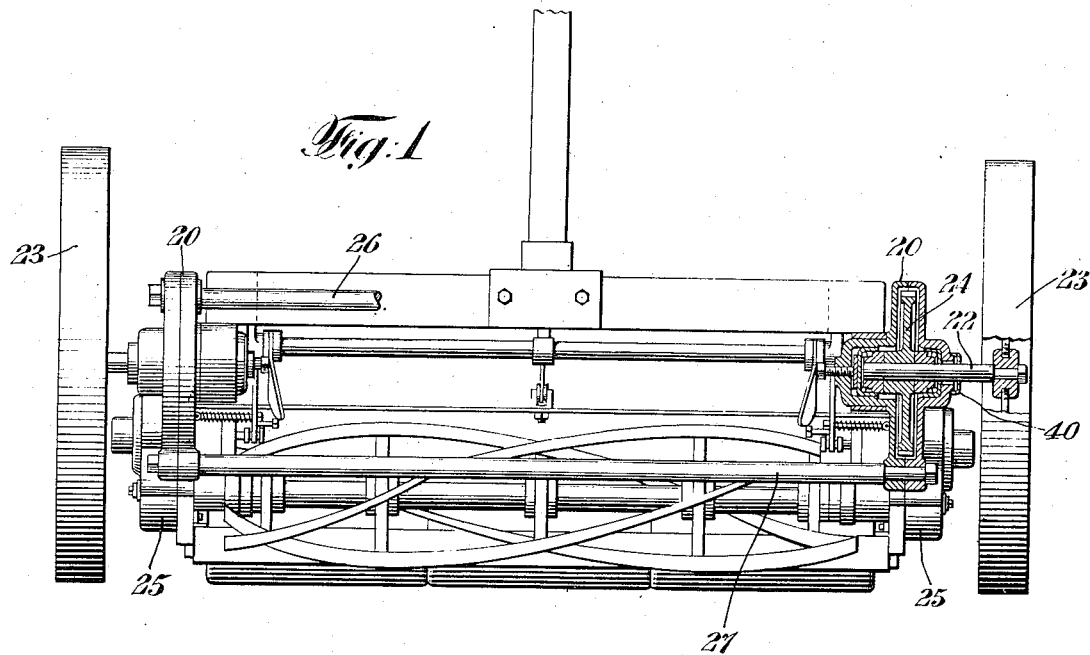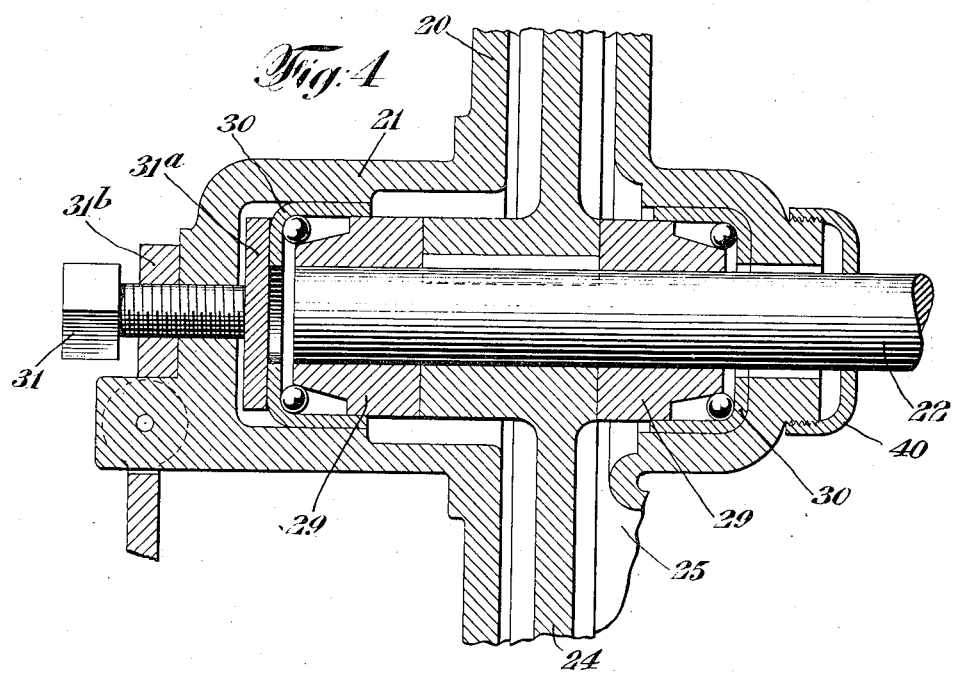

UNITED STATES PATENT OFFICE.

WILLIAM H. COLDWELL, OF NEWBURGH, NEW YORK.

WHEEL-MOUNTING.

1,279,268.  Specification of Letters Patent.  Patented Sept. 17, 1918.

Original application filed June 15, 1916, Serial No. 103,754. Divided and this application filed September 21, 1916. Serial No. 121,367.

*To all whom it may concern:*

Be it known that I, WILLIAM H. COLDWELL, a citizen of the United States, residing at Newburgh, in the county of Orange and State of New York, have invented certain new and useful Improvements in Wheel-Mountings; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one embodiment of my invention selected by me for purposes of illustration, and the said invention is fully disclosed in the following description and claims.

This application is a division of my former application for Letters Patent of the United States filed June 15th, 1916, and given Serial #103,754, in which the subject-matter of this application was disclosed and claimed, and my said invention is also illustrated and described in my co-pending application filed March 29th 1916, Serial No. 87,444, though not specifically claimed therein.

My invention consists of an improved wheel mounting which is especially desirable for use in lawn mowing machines and the like. One of the most serious defects in the manufacture and use of lawn mowers is the tendency of the ground wheels, as soon as they wear their bearings slightly, to wabble, which produces a great deal of noise in the use of the machine and makes the position of the cutters unsteady with respect to the grass. Machines are frequently thrown aside as worn out when the real difficulty with them is that the ground wheel bearings are loose and worn and cannot be adjusted or tightened. By my invention this difficulty is overcome and the bearings for both wheels can be adjusted independently so as to hold the wheel steady in relation to the frame of the machine and the driving parts leading to the rotary cutter and obviate the noise and vibration in the operation of the machine, and my invention provides a construction by which the bearings can be adjusted from time to time as may be necessary to maintain them always in proper condition.

Referring to the drawings accompanying and forming part of this specification:

Figure 1 is a front elevation of a lawn mower embodying my invention, the parts relating to my invention, at one side of the machine, being shown in section.

Fig. 2 is a longitudinal sectional view of the lawn mower drawn to an enlarged scale.

Fig. 3 is a sectional view on line 3—3 of Fig. 2.

Fig. 4 is an enlarged sectional view of the wheel mounting.

In the lawn mower selected by me for purposes of illustrating the invention and shown in the accompanying drawings and also shown and described in both of my co-pending applications hereinbefore referred to, 20—20 represent parallel side frames of a lawn mower, each of which is provided on its inner face with an enlarged friction hub, 21, in axial alinement transversely of the machine and each of said side frames is provided with a stub axle, 22, which is rigidly secured to one of the ground wheels, 23, which wheels support the forward portions of the side frames, and also serve to drive the rotary cutter. Each of said axles is provided with a driving gear, 24, for transmitting power to drive the rotary cutter, and said frames are provided with suitable bearings for the axle, for the shaft of the rotary cutter and for the intermediate gearing, in any suitable manner.

I prefer to provide each side frame with an exterior gear casing, 25, forming part thereof and secured rigidly thereto, but said side frames may be formed in other ways. In the present instance, I have shown the side frames rigidly connected by transverse tie-rods, 26—27, which serve to hold the gear casings and side frames together, and also to connect the two side frames. The gear wheel, 24, is preferably splined or keyed on the stub axle, 22, and the stub axle is provided with bearing cones, 29—29, which I term the inner bearing members, engaging balls carried in cups, 30, which I term the outer bearing members and which are supported in recesses in the friction hub, 21, of the side frame, and a corresponding portion of the gear case, and I provide a set screw, 31, extending, in this instance, through the end of the hub, 21, on the inside of the side frame and engaging a plate, 31ª, in contact with the inner cup, 30, said inner cup being capable of sliding in the hub in a direction longitudinally of the axle. It will be seen that this one set screw will accurately adjust the entire bearing for each stub axle including both cones and both cups, and the set screw is preferably provided with a jam nut, 31ᵇ, for locking it in adjusted position.

It will be seen that this mounting holds the stub axle rigidly in line with respect to the side frame or other support for the bearing, and in case of wear any looseness can be readily taken up by means of the set screw, 31, which forces the inner cup in a direction lengthwise of the axle. It will also be noted that the wheel is rigidly secured to the axle so that no looseness can occur between the two parts and the gear member with which each wheel and axle is associated is applied to the axle, in this instance, between the bearings therefor.

In the specific lawn mower shown in the drawings, the gear member is connected by intermediate gearing with the shaft, 32, of the rotary cutter, the end portions of which are mounted in bearings and side frames and, in this specific embodiment mechanism is provided for disconnecting the gear member, 24 from the rotary cutter. This mechanism, however, forms no part of the present invention and will, therefore, not be particularly described nor claimed herein.

It will be seen that the main frame and gear casing are provided with parallel portions which inclose entirely the gear 24 and form a gear casing therefor whereby the bearing members, both interior and exterior, are completely inclosed and dust and foreign matter is prevented from getting into the same, while any lubricating material in the gear casing is prevented from escaping. As an additional precaution, I prefer to provide the recessed portion through which the shaft 22 extends with a threaded cap indicated at 40, which closely fits the shaft and assists in excluding the dust and preventing the exhaust of grease, oil or other lubricating material contained in the gear casing.

It will also be seen that the adjusting mechanism for the movable exterior bearing can be operated from the outside of the gear casing without opening the gear casing or exposing any of the parts to dust.

What I claim and desire to secure by Letters Patent is:

1. In a bearing, the combination with a supporting frame having separated parallel walls forming an inclosing casing, said walls having oppositely disposed bearing recesses, an outer bearing member in each of said recesses, a shaft extending centrally through said recesses and bearing members, inner bearing members carried by said shaft and coöperating with the outer bearing members, a gear located on said shaft between the bearing members and carried thereby, said gear and all the said bearing members lying within said inclosing casing and its recesses, and a driving wheel secured to said shaft outside of said gear casing.

2. In a bearing, the combination with a supporting frame having separated parallel walls forming an inclosing casing, said walls having oppositely disposed bearing recesses, an outer bearing member in each of said recesses, a shaft extending centrally through said recesses and bearing members, inner bearing members carried by said shaft, and coöperating with the outer bearing members, a gear located on said shaft between the bearing members and carried thereby, said gear and all the said bearing members lying within said inclosing casing and its recesses, and adjusting means for one of the outer bearing members, having an operating portion extending outside of the gear casing.

3. In a bearing, the combination with a supporting frame having parallel walls forming an inclosing casing, and oppositely disposed bearing recesses, an outer bearing member in each of said recesses, a shaft extending centrally through said recesses and their bearing members, inner bearing members carried by said shaft, a gear on each of said shafts and secured to rotate therewith between and in contact with said inner bearing members, said gear and all of said bearing members lying within said inclosing casing, a driving wheel rigidly secured to said shaft outside of said casing, and an adjusting device having an operating part outside of said casing and a part extending through the same and into engagement with one of said outer bearing members, whereby both bearings formed by said bearing members, on opposite sides of said gear, will be simultaneously adjusted, and whereby said gear will be firmly held between the inner bearing members.

In testimony whereof I affix my signature.

WILLIAM H. COLDWELL.